United States Patent Office 3,510,525
Patented May 5, 1970

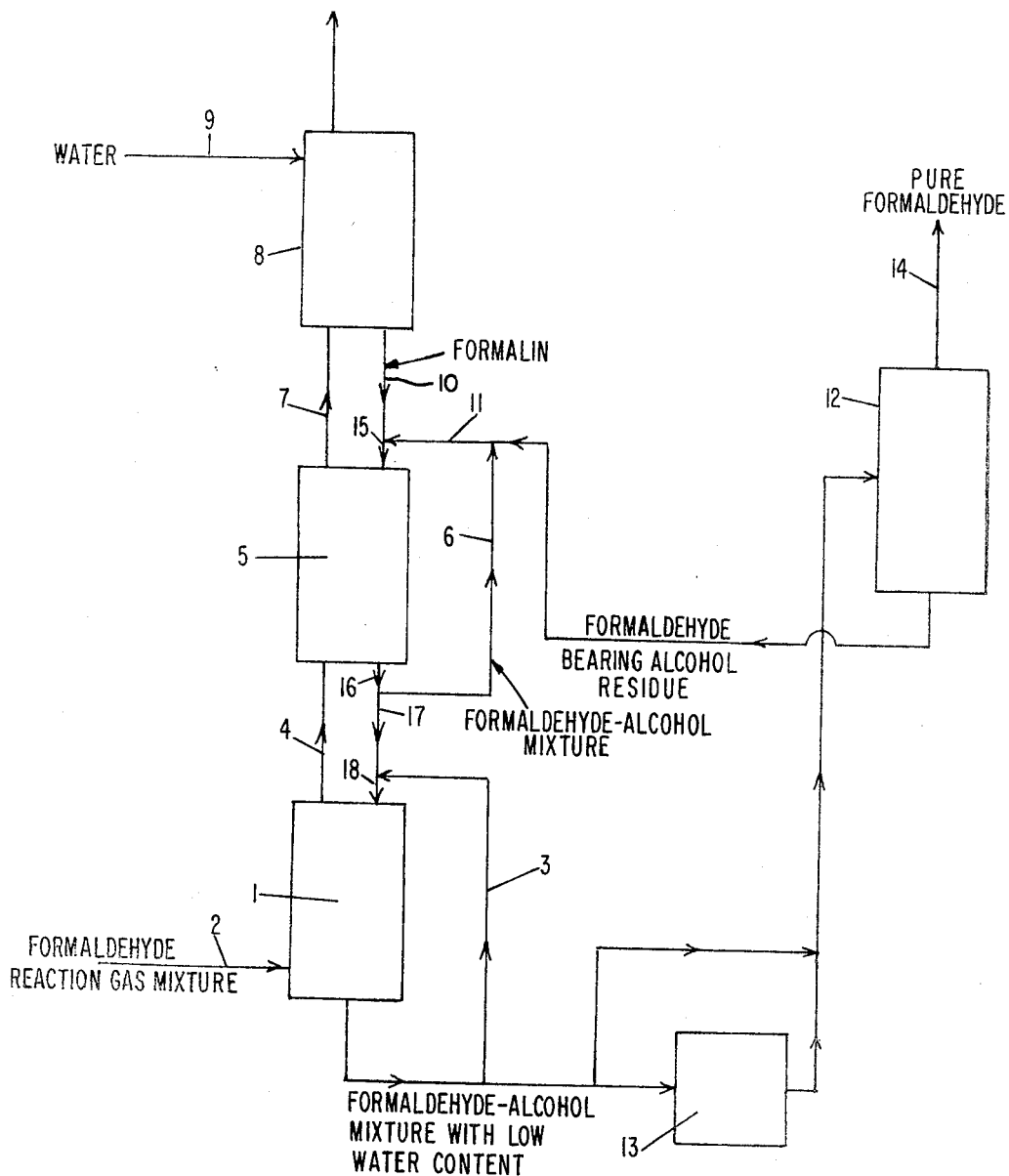

3,510,525
PROCESS FOR THE MANUFACTURE OF
GASEOUS FORMALDEHYDE
Per G. M. Flodin and Carl-Axel E. Sjögreen, Perstorp,
Sweden, assignors to Perstorp Aktiebolag
Filed July 12, 1965, Ser. No. 471,131
Int. Cl. C07c 47/04
U.S. Cl. 260—606                                4 Claims The present invention relates to the production of pure, gaseous formaldehyde by thermal decomposition of hemi-acetals formed by absorption of formaldehyde in poly-hydric alcohols.

Production of pure, anhydrous formaldehyde gas is of great technical interest, as the pure formaldehyde can be polymerized to thermoplastics with good properties. The pure gaseous formaldehyde is also of interest as a raw material for synthesis of low molecular weight products.

Formaldehyde is generally produced by catalytic oxidation in the gaseous phase of methanol with air. In the general types of processes a reaction gas containing 5–6 percent by weight of formaldehyde, 7–8 percent of water, small amounts of formic acid and other impurities and the residue oxygen and nitrogen is obtained.

The formaldehyde is generally obtained from the reaction gas through absorption in water, whereby 37–60 percent Formalin solutions are obtained.

Several metholds for the purification of formaldehyde are known. These are concerned with transforming Formalin solutions (with a formaldehyde percentage of 37–60) to paraformaldehyde or α-polyoxymethylene, which is then thermally decomposed after removal of the water. This method is expensive, and further purification steps for removing the remaining water after the decomposition are required, e.g. by contacting the gas with solid drying agents or suitable washing liquids in order that the gas shall satisfy the usual requirements of dryness.

Another method is to react the formaldehyde with an aliphatic alcohol to a hemi-formal, which is purified, dried and then thermally decomposed to pure, gaseous formaldehyde and free alcohol. The alcohol may then be reacted with further formaldehyde and so on. All these methods concern the purification of Formalin solutions and are described further in e.g. U.S. Pat. No. 2,848,500 and German Pat. 1,151,250. They are all accompanied by large energy costs, as large amounts of water have to be removed.

A process, by which one starts direct from the diluted formaldehyde gas, which is obtained from the oxidation of methanol, is described in Belgian Pat. No. 615,778. According to that patent the reaction gas is first passed through a packed column, which is kept at a temperature of 30–100° C. In the column a formaldehyde bearing water solution of a polyhydroxyl compound with a vapor pressure of below 2 mm. Hg at 100° C., preferably penta-erythritol or trimethylolpropane, is circulated. The water content in this solution is approx. 8–15 percent. A part of the formaldehyde content of the reaction gas is absorbed in this solution, while the residue is absorbed in water in the upper part of the column or in a separate column.

Besides the water-formaldehyde solution also the residue from the decomposition step, i.e. alcohol with smaller amounts of solved formaldehyde, is fed to the upper part of the packed column.

The solution being drawn out from the bottom of the packed column contains approx. 8–15 percent water. Owing to this high water content, which cannot be reduced by such a two stage process without high losses, the mixture has to be dewatered through evaporation in vacuum before the thermal decomposition.

The dry hemi-formal from the evaporation in vacuum is then decomposed at 120–150° C. in a pyrolysis column to give pure, gaseous formaldehyde and a diluted form-aldehyde-alcohol solution, which is returned to the absorption step.

Also by this process large amounts of energy are consumed to remove water from the solution received by the absorption. As vacuum distillate an approx. 20 percent Formalin solution is obtained, which has a very limited use and which primarily may be looked upon as a loss. The evaporation in vacuum requires moreover expensive apparatus.

According to the present invention gaseous formaldehyde is produced by absorbing formaldehyde in a polyhydric alcohol thus forming a hemi-acetal, which hemi-acetal thereafter is thermally decomposed and the method is characterized in that a moist air-formaldehyde gaseous mixture coming from a formaldehyde reactor in a first step is brought to flow in counter-current to a circulating, relatively dry formaldehyde-alcohol mixture at a temperature of 80–130° C., preferably 90–120° C. (or 100–110° C.), whereupon in a second step formaldehyde in the gaseous mixture is absorbed in counter-current to a moister formaldehyde-alcohol mixture at a lower temperature, and finally in a third step the rest of the formaldehyde in the gaseous mixture is absorbed in counter-current to water.

A part of the formaldehyde-alcohol mixture circulating in the first step is drawn off for further purification, while the formaldehyde-alcohol mixture in the second step is led into the circulating mixture in the first step and the formaldehyde-water mixture from the third step together with formaldehyde bearing alcohol residue from the decomposition step is led into the circulating solution in the second step. Through this method a formaldehyde-alcohol mixture with such a low water content is received that in certain cases it can be led direct to the decomposition step. The water content in this outgoing mixture is as low as from ½–3 percent. This brings considerable advantages compared with processes known before, by which the removal of the water is one of the most difficult and expensive working operations, and moreover results in large losses of formaldehyde. In certain cases also the hemi-acetal obtained according to the present invention should be dried. This drying may be accomplished by the use of solid drying agents, by counter-current of dry air or the like, and it is a considerably easier working procedure than the processes known, by which large amounts of water had to be removed.

The invention is described further in the following with reference to the enclosed figure, which shows a flow sheet of the process.

The reaction gas from a formaldehyde reactor is led into an absorption column e.g. a packed column 1 via the conduit 2. The temperature at the bottom of this is kept at 80–130° C., preferably at 100–110° C.

In the column a formaldehyde mixture 3, which contains only small amounts of water ½–5 percent, usually 1–3 percent, and 40–50 percent formaldehyde is circulated. The gas 4 coming out from the top of the column 1, the formaldehyde-water content of which has now increased, is led into a second column 5, e.g. a packed column at its bottom, which is kept at 40–80° C., preferably at 50–65° C. In this column a part of the formaldehyde in the gas mixture is absorbed in a circulating formaldehyde-alcohol-water mixture 6. The gas 7 coming out from the top is conducted into a column 8, e.g. a bottom column, which has a top temperature of 35–55° C., preferably 40–50° C. In the top of this column 8, water 9 is added, and in the bottom of column 8 a Formalin solution 10 is taken out. This solution 10 is combined with the circulating formaldehyde-alcohol-water mixture 6, and the remaining liquid 11 from the decomposition step 12 into stream 15, which is fed to the top of the column 5. The formaldehyde-alcohol mixture 16 is removed from the bottom of the column 5 and separated into the circulating formaldehyde-alcohol-water mixture 6 and exit stream 17. The exit stream 17 is then combined with the formaldehyde mixture 3 into stream 18 which is introduced into the top of column 1. The air, containing water vapour and traces of gaseous formaldehyde, flows out into the open air from the top of the column 8. A part of the mixture 3 circulating in the column 1 is fed either direct to the decomposition step 12 or is dried further in a suitable drier 13. The pure formaldehyde gas 14 is obtained by the decomposition. A hemi-formal with a low water content and yet a high formaldehyde content is thus obtained by this three-step absorption.

What really happens in the high temperature column 1 is that a drying of the hemi-formal mixture from the column 5 takes place without any essential escape of the formaldehyde. Also with a small amount of transferring units it is easy to get the water content of the gas raised to a value, which lies near the equilibrium vapor pressure above the circulating hemi-formal. The equilibrium vapor pressure of formaldehyde above the circulating hemi-formal is namely rather high (200–250 mm. Hg) and saturation of the gas would bring the formaldehyde content in the circulating liquid to fall considerably.

There seems, however, to be some kind of resistance to the mass transfer as to formaldehyde. The column effect measured as the ratio between the concentration change brought about and the driving force (the difference between the equilibrium vapor pressure and the actual partial pressure of the gas) is 3–4 times larger for water than for formaldehyde. This can be explained by the assumption that the velocity of the chemical decomposition of the hemi-formals at the prevailing temperatures is so low that it limits the velocity, with which the formaldehyde can be delivered to the gaseous phase.

As mentioned above the hemi-formal received from the absorption system can be fed direct to the decomposition step, whereby a 96–97 percent formaldehyde gas is obtained. If a purer formaldehyde gas is desired, the hemi-formal can be dried by bringing it into contact with solid drying agents or into counter-current contact with dry air or by some other suitable drying method. The dry hemi-formal is the pyrolyzed in a way known per se.

Alcohols being especially suitable for the process are such ones having a high boiling point, preferably above approx. 200° C. at atmosphere pressure and which have a vapor pressure of preferably less than 2 mm. at 100° C. As examples the following alcohols can be mentioned: glycerine, higher polyglycols, diethylene and triethylene glycols, dipropylene glycol, triethanolamine, 1,2,3-butanetriol, 1,2,4-butanetriol, 1,2,3-pentanetriol, 1,2,4-pentanetriol, 2,3,4 - pentanetriol, 1,2,5 - hexanetriol, 2,2 - dimethyl-1,3-propanediol, trimethylolpropane, trimethylolethane, erythrite, ramnite, sorbite, mannite and pentaerythrite.

EXAMPLE

At the bottom of the first packed column 1 6000 l./h. of a gas consisting of 6 percent formaldehyde, 7 percent $H_2O$, the rest being air, is supplied. In the column a solution consisting of 50 percent formaldehyde, 1.6 percent water, the rest being trimethylolpropane, is circulated. Of this solution 1.00 kg./h. was taken out as a bottom product. The column worked at 102° C.

The gas leaving the top of the column 1 was led in at the bottom of the next packed column 5. The main part of the formaldehyde content of the gas was absorbed here in the circulating hemi-formal-water mixture, of which 1.62 kg./h. was fed into the top of the column 1. The column 5 worked at 60° C.

The gas, leaving the top of the column 5 was fed into the very bottom of the bottom column 8, into which column 0.12 kg. $H_2O$/h. was added at the top. In this column the remaining formaldehyde was absorbed in the water. The gas coming out from the top of the column 8 contained besides air only traces of formaldehyde and 0.42 kg.$H_2O$/h.

At the bottom of the column 8 a formaldehyde solution was taken out and fed into the top of the column 5 together with the liquid received as residue after pyrolysis of the dried hemi-formal. The pyrolysis residue contained 10 percent formaldehyde and the rest trimethylolpropane and was fed with a velocity of 0.54 kg./h.

The bottom product from the column 1 is then conducted either direct or via a de-watering step to an apparatus, where it is thermally decomposed at 130–150° C.

If the liquid from the column 1 is pyrolyzed directly, a gas with a purity of approx. 96 percent is received.

The invention is not limited to the embodiment example shown above, as this can be modified in different ways within the scope of the invention. Consequently the three shown absorption columns can for example be combined to only one column including the three absorption steps mentioned.

What is claimed is:

1. In a process for producing pure anhydrous formaldehyde gas including the steps of absorbing crude formaldehyde in water and a polyhydric alcohol having a boiling point above approximately 200° C. at atmospheric pressure and a vapor pressure of less than about 2 mm. at 100° C. to form a hemi-acetal and thereafter thermally decomposing the hemi-acetal, the improvement which comprises absorbing the formaldehyde in three stages, (1) bringing in counter-current flow the gas mixture and a circulating, relatively dry formaldehyde-alcohol mixture at a temperature of 80–130° C., (2) bringing in counter-current flow effluent gases from the first stage, having a greater water and formaldehyde concentration than the gas mixture, and a relatively moist formaldehyde-alcohol mixture at 40–80° C., and (3) absorbing by water the remaining formaldehyde in effluent gases from the second stage, wherein a part of the circulating formaldehyde-alcohol mixture in the second stage is fed to the circulating formaldehyde-alcohol mixture in the first stage, the water with absorbed formaldehyde-alcohol in the third stage together with the residue from the thermal decomposition is supplied to the circulating formaldehyde-alcohol in the second stage, and a part of the formaldehyde-alcohol mixture circulating in the first stage is conducted directly to the decomposition stage without preliminary drying.

2. Process according to claim 1 characterized in that the temperature in the second step is approx. 40–80° C., preferably 50–65° C., and in the third step 35–55° C., preferably 40–50° C.

3. Process according to claim 1, characterized in that a part of the formaldehyde-alcohol mixture circulating in the first step is fed to the decomposition step after drying.

4. Process according to claim 1, characterized in that the relatively dry formaldehyde-alcohol mixture circulating in the first step contains 0.5–3 percent by weight water and 30–60 percent by weight formaldehyde.

References Cited

FOREIGN PATENTS 659,088  3/1963  Canada.

BERNARD HELFIN, Primary Examiner

R. H. LILES, Assistant Examiner